United States Patent [19]
Cawley et al.

[11] Patent Number: 5,383,760
[45] Date of Patent: Jan. 24, 1995

[54] APPARATUS AND METHOD FOR CONTAINER PATTERN-FORMING AND PALLETIZING

[75] Inventors: Wesley D. Cawley, Port Neches; Clifton M. Cawley, Nederland, both of Tex.

[73] Assignee: Ohmstede-Cawley, Ltd., Beaumont, Tex.

[21] Appl. No.: 146,994

[22] Filed: Nov. 1, 1993

[51] Int. Cl.⁶ .................. B65G 47/24; B65G 57/14
[52] U.S. Cl. ...................... 414/791.6; 414/793.4; 414/794.7; 198/415; 198/588
[58] Field of Search ............ 414/791.6, 794.3, 793.4, 414/794.7, 794.4; 198/415, 587, 588, 817

[56] References Cited

U.S. PATENT DOCUMENTS

| | | | |
|---|---|---|---|
| 2,703,182 | 3/1955 | Broberg et al. | |
| 2,721,645 | 10/1955 | Eberle | 198/588 |
| 2,997,187 | 8/1961 | Burt | 414/792.1 |
| 3,184,038 | 5/1965 | Petchuk | 198/588 |
| 3,901,391 | 8/1975 | Carlson et al. | 198/235 |
| 3,902,609 | 9/1975 | Ohlsson | 198/237 |
| 4,002,249 | 1/1977 | Shinomiya et al. | 214/6 H |
| 4,022,334 | 5/1977 | Lassig | 214/6 P |
| 4,026,422 | 5/1977 | Leenaards | 198/588 |
| 4,239,433 | 12/1980 | Hanson | 414/794.3 |
| 4,439,084 | 3/1984 | Werkheiser | 414/62 |
| 4,676,361 | 6/1987 | Heisler | 198/415 |
| 4,815,924 | 3/1989 | Jaatinen | 414/794.3 |
| 4,898,511 | 2/1990 | Rossig et al. | 414/794.3 |
| 4,901,842 | 2/1990 | Lemboke et al. | 198/415 |
| 5,074,400 | 12/1991 | Focke et al. | 198/374 |
| 5,129,643 | 7/1992 | Johnson et al. | 414/794.4 |
| 5,183,144 | 2/1993 | Francioni | 198/415 |
| 5,191,962 | 3/1993 | Wegscheider et al. | 198/415 |
| 5,195,627 | 3/1993 | Wyman | 198/415 |
| 5,271,709 | 12/1993 | Vander Meer et al. | 494/794.7 |
| 5,316,123 | 5/1994 | Achelpohl | 198/415 |

FOREIGN PATENT DOCUMENTS

| | | | |
|---|---|---|---|
| 2407155 | 5/1979 | France | 414/794.3 |
| 2525570 | 10/1983 | France | 198/588 |
| 3340322 | 5/1985 | Germany | 198/588 |
| 6706571 | 11/1967 | Netherlands | 414/794.4 |
| 2224986 | 5/1990 | United Kingdom | 198/415 |

OTHER PUBLICATIONS

Baldor's Servo Motor Brochure.
Toshiba's Brushless DC Servo Motors RA12/RA22-/RAD021/RAD12 Brochure.
Titan Precision Tables Brochure.

*Primary Examiner*—David M. Mitchell
*Assistant Examiner*—Christopher G. Trainor
*Attorney, Agent, or Firm*—Pravel, Hewitt, Kimball & Krieger

[57] ABSTRACT

Apparatus and method for arranging a plurality of containers into desired patterns and palletizing the containers onto pallets. The apparatus has an infeed conveyor and an orienting unit having a receiving end and a moveable discharge end. The orienting unit includes a pair of side-by-side orienting conveyor belts which have independent speed controls. A container on the pair of orienting conveyor belts can be rotated by controlling the differential speed of the pair of belts. The receiving end of the orienting unit is pivotably connected to a fixed stanchion so as to permit the discharge end of the orienting unit to rotate in a horizontal plane. The orienting unit is also constructed so that its length may be lengthened or shortened to discharge the container at any location on a pattern forming table. A pusher bar transfers a layer of containers from the forming table onto an adjacent surface. The adjacent surface is horizontally slid from beneath the layer of cartons onto a pallet.

28 Claims, 3 Drawing Sheets

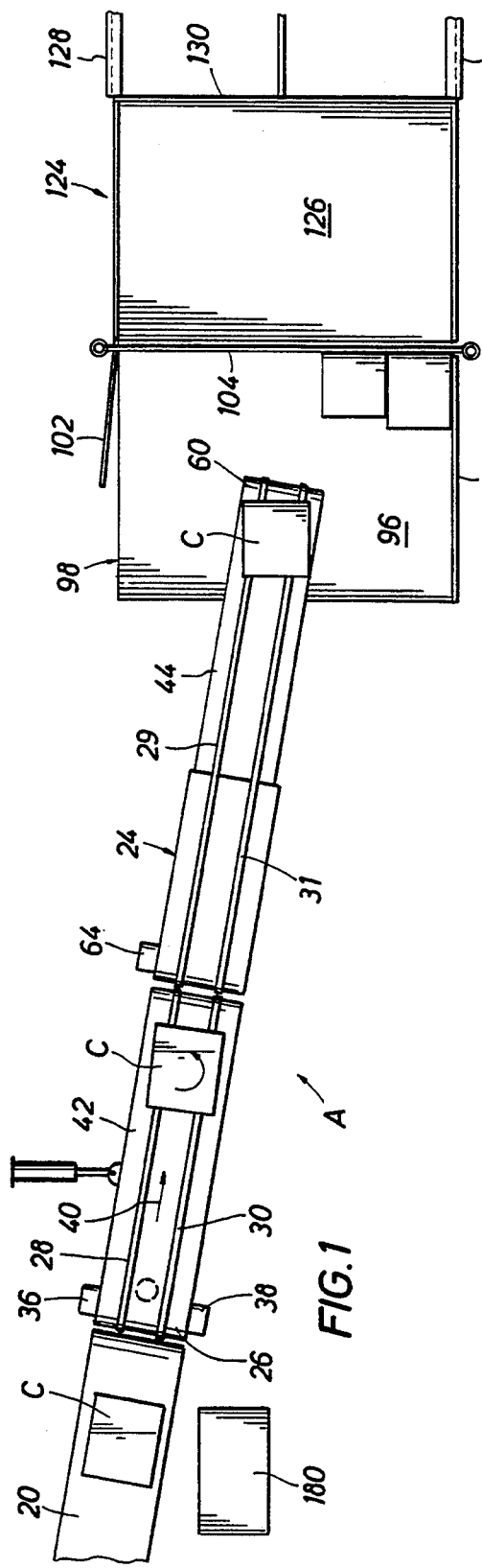
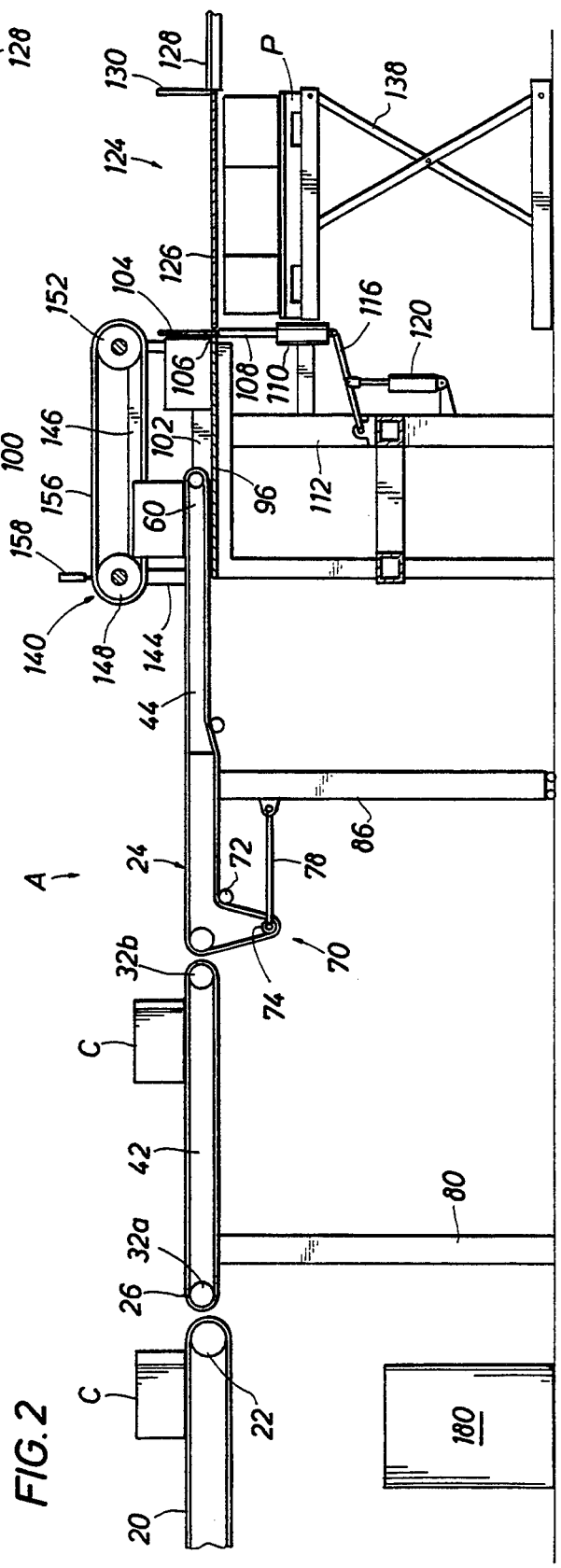

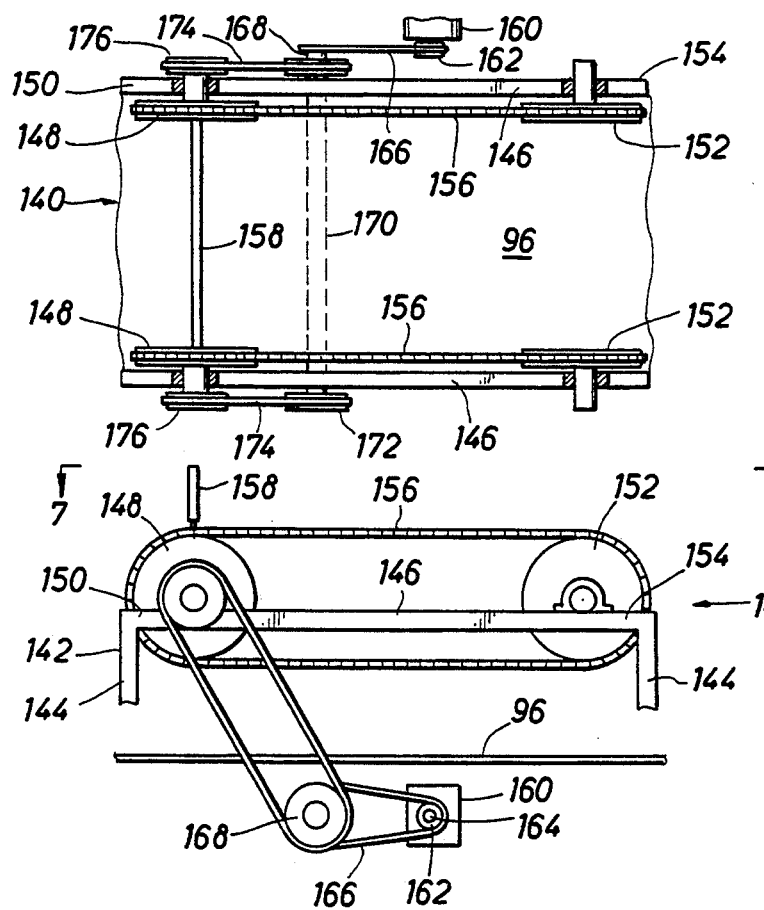
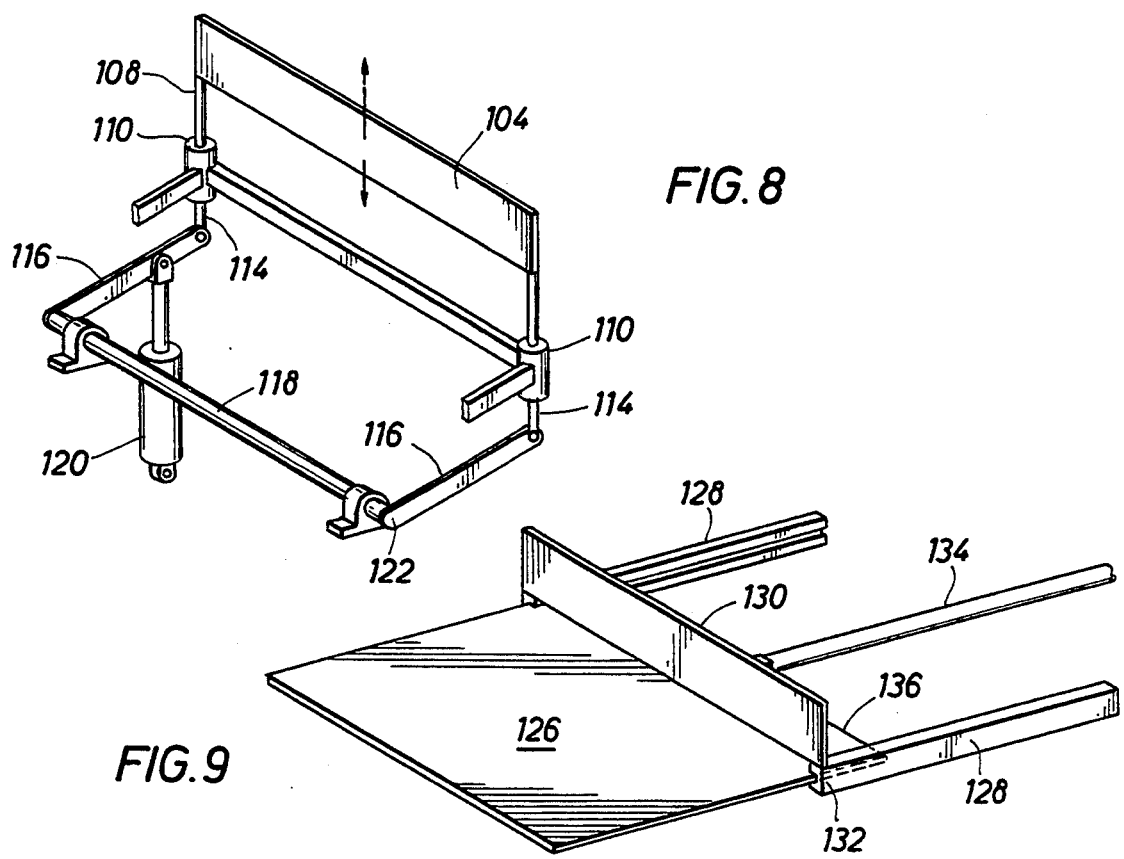

APPARATUS AND METHOD FOR CONTAINER PATTERN-FORMING AND PALLETIZING

BACKGROUND OF THE INVENTION

1. Field of the Invention

The present invention relates to a method and apparatus for container pattern-forming and palletizing the containers in predetermined patterns on pallets.

2. Description of the Prior Art

Containers or packages are commonly placed on pallets in order to facilitate their movement. In the art of palletizing containers, it is well known to arrange a plurality of containers into a layer and then sequentially stack the layer in tiers on a pallet. Sequential tiers with alternate arrangements of containers will be stable and do not have a propensity to tip over.

Robots have been used to load a pallet with containers. They are very versatile and can be programmed to produce almost any pattern. Robots, however, can be slow because they pick up a container and carry it to some point, then return for another. Having to move back and forth between pick up and placement points limits the speed with which the pallet can be loaded.

Machines that arrange containers into an orderly pattern and then successively stack tier upon tier to form a pallet load are also known in the art. These machines typically place the container by passing it through a series of pins, stops and pushers before ultimately getting the container to the desired location. Often times, manual adjustments must be made to change patterns. Some patterns may be difficult or impossible to form by this method.

Various types of diverting, orienting and guiding devices to direct containers for placement onto pallets are known in the prior art. See, for example, U.S. Pat. No. 5,195,627 for a pattern-forming apparatus for container palletizing. The '627 patent discloses input guide conveyor rollers which are selectively moveable between left, right or centered position for guiding containers onto one of a plurality of receiving rollers. A pattern forming zone comprising a plurality of parallel, power driven conveyors have a differential speed-control mechanism. A pusher bar pushes a layer of containers from a transfer plate onto pallets in a stacking chamber. The stacking chamber comprises a lift on which pallets are moved to receive successive tiers of containers. See also U.S. Pat. Nos. 4,002,249 and 4,901,842.

It is desirable to have a palletizing apparatus which is fast, versatile and computer programmable. It is further desirable that the palletizing apparatus have the ability to move its discharge end anywhere within a predetermined area in a horizontal plane to accommodate a wide variety of predetermined patterns.

SUMMARY OF THE PRESENT INVENTION

The apparatus for container pattern-forming and palletizing of the present invention is fast, versatile and computer programmable. The apparatus has the ability to move its discharge end anywhere within a predetermined area in a horizontal plane for delivery of the containers and to accommodate a wide variety of predetermined patterns.

The apparatus for container pattern-forming and palletizing includes an infeed conveyor that accepts product, such as a container, and transports it to a fixed location. A receiving end of a generally horizontal orienting unit is positioned at the fixed location to receive the container from the infeed conveyor. The orienting unit includes a pair of substantially parallel endless belt conveyors in side-by-side array. A separate drive means is provided for independently driving each belt conveyor independently of the other. The orienting unit further includes a delivery conveyor and means for adjusting the relative distance between the receiving end and a discharge end of the orienting unit.

The orienting unit has the ability to rotate the container at the same time as being transported by it. This is accomplished by driving the two parallel orienting belt conveyors at different speeds. As the container is transported by the parallel orienting belt conveyors, the container can be rotated by running the belt conveyors at different speeds.

The discharge end of the orienting unit is located over a smooth forming table of a pattern forming assembly. The pattern forming assembly includes a pair of side walls and a retractable back wall adjacent the rear of the forming table. The retractable back wall can be lowered below the forming table.

A pusher bar is capable of sweeping above the forming table and sliding a tier of containers on the forming table to an adjacent surface. The adjacent surface is mounted in a pair of horizontal slides and is capable of sliding horizontally. The adjacent surface is mounted directly over a vertical lift device, such as a scissor lift, for positioning the pallet. A programmable control computer accurately controls the conveyor belt speeds and the length and horizontal positioning of the orienting unit.

The containers enter the orienting unit single file. The angular orientation of the container is programmable and controlled by the two parallel orienting conveyor belts. The position of the discharge end of the orienting unit is also programmable and controlled to deliver the container to the desired location on the forming table via the delivery belt. The first container is normally placed into a corner formed by the retractable back wall and a side wall. The container is discharged with enough velocity to carry it clear of the end of the orienting unit. Subsequently, the container position is determined by the desired pattern programmed into the control computer. The discharge end of the orienting unit moves from one placement point to another. The containers can be placed very fast. Since all functions are performed by servo motors controlled by a computer, patterns of almost infinite variety can be produced instantly.

When a layer or tier of containers has been completed, the back wall drops below the pattern forming table and the pusher bar pushes the tier onto the adjacent surface, after which the back wall comes back up and the apparatus begins the next tier. The adjacent surface moves horizontally, allowing the containers on it to drop a short distance onto the pallet supported by the vertical lift device. The vertical lift device then lowers until the tops of the containers are just below the adjacent surface. The adjacent surface returns to its original position.

The process continues until the desired number of tiers are stacked on the pallet. The loaded pallet is removed from the vertical lift device and a new pallet is placed on the lift device. The lift device raises the empty pallet to an elevation just below the adjacent surface ready for another cycle.

BRIEF DESCRIPTION OF THE DRAWINGS

In order to more fully understand the drawings referred to in the detailed description of the present invention, a brief description of each drawing is presented, in which:

FIG. 1 is top plan view of the pattern-forming apparatus for container palletizing of the present invention, the pusher bar assembly being removed for clarity;

FIG. 2 is a side elevational view of the pattern-forming apparatus;

FIG. 6 is a side elevational view of a portion of the pattern-forming apparatus showing the pusher bar assembly;

FIG. 7 is a view taken along line 7—7 of FIG. 6;

FIG. 8 is a side perspective view of a portion of the pattern-forming apparatus showing the retractable back wall assembly; and FIG. 9 is a side perspective view of a portion of the pattern-forming apparatus showing the adjacent surface assembly.

DETAILED DESCRIPTION OF THE INVENTION

Figure 3:
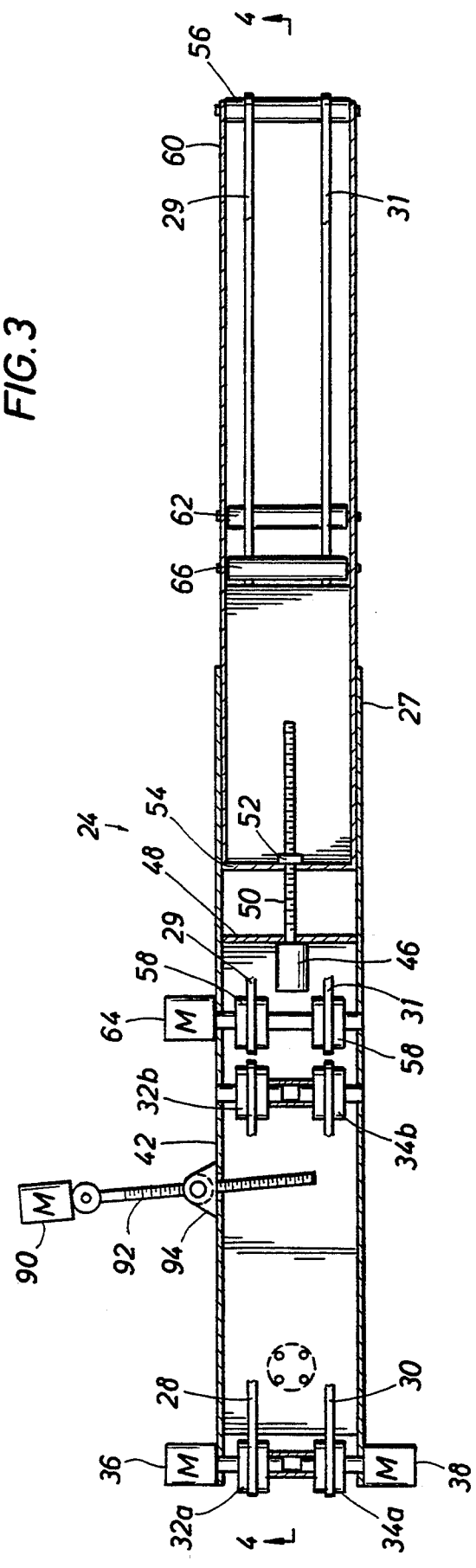
FIG. 3 is a section view taken along line 3—3 of FIG. 4 of the orienting unit of the pattern-forming apparatus.

With reference now to the drawings, and particularly to FIGS. 1 and 2, the pattern-forming apparatus for container palletizing, designated generally as A, comprises an infeed conveyor 20 serving to deliver a succession of products or containers C in a predetermined, uniform starting orientation. The infeed conveyor 20 is preferably an endless belt conveyor which is trained over a driven pulley 22 so that the containers C are advanced in a direction to the right, namely, into the range of an orienting unit, designated generally as reference numeral 24. Alternatively, the endless belt conveyor 20 can be replaced with other suitable means for delivering containers C to the orienting unit 24, as for example, using a plurality of parallel spaced rolls to transport the containers C.

Figure 5:
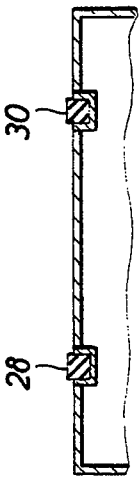
FIG. 5 is sectional view taken along line 5—5 of FIG. 4.

The infeed conveyor 20 transports the container C to a predetermined location at a receiving end 26 of the orienting unit 24. The orienting unit 24 is generally horizontal and the receiving end 26 is positioned at the fixed location to receive the container C from the infeed conveyor 20. The orienting unit 24 includes a plurality of orienting members illustrated in FIGS. 1 and 3 as a pair of spaced-apart, parallel endless belt orienting conveyors 28 and 30 in side-by-side array and a pair of spaced-apart, parallel endless belt delivery conveyors 29 and 31. The upper surfaces of the belt conveyors 28, 29, 30, and 31 are disposed in or very close to a common plane as shown in FIG. 5, particularly in a substantially horizontal plane.

Referring to FIG. 3, the orienting belt conveyors 28 and 30 are driven by separate drive pulleys or rollers 32a and 34a, respectively, powered and rotated by separate motors 36 and 38, respectively. A pair of orienting conveyor return rollers 32b and 34b are independently mounted to an elongated box-shaped outer frame 42.

Preferably, the motors 36 and 38 are servo motors. The servo motors 36 and 38 are independently driven by a velocity controlling amplifier (not shown) which receives commands from a computer 180 (FIGS. 1 and 2) located either remote or close to the pattern-forming apparatus A. The motion of each servo motor 36, 38 is coupled to a position feedback transducer (not shown) which sends positional information to the controlling computer 180, thus allowing the computer 180 to accurately control the position of the device driven by the servo motor. Servo motors are commercially available from Toshiba Corporation. The computer 180 is a commercially available industrial programmable logic device, embedded controller, or other similar intelligent device.

Typically, the orienting belt conveyors 28 and 30 are driven in the direction of the arrow 40 (FIG. 1). The speed of the orienting belt conveyor 28 can exceed, be the same or be less than the speed of the orienting belt conveyor 30.

The orienting unit 24 includes an elongated box-shaped outer frame 42 and a moveable inner frame 44 arranged to move into and out from the outer frame 42. Although not shown, sliding or roller means may be provided to facilitate the smooth extension and retraction of the inner frame 44 relative to the outer frame 42. One such means for facilitating the smooth extension and retraction is disclosed in U.S. Pat. No. 4,002,249, the disclosure of which is incorporated by reference.

Referring to FIG. 3, the delivery belt conveyors 29 and 31 are driven by a pair of drive pulleys 58 powered and rotated by a motor 64 mounted to the outer frame 42. It is to be understood that a single delivery belt could be used in place of the pair of delivery belt conveyors 29 and 31 in which case a single drive pulley would replace the pair of drive pulleys 58 shown in FIG. 3. Additionally, it is to be understood that separate drive means for each of the delivery belt conveyors 29 and 31 could be used to provide further angular orientation of the containers C prior to discharge.

Figure 4:
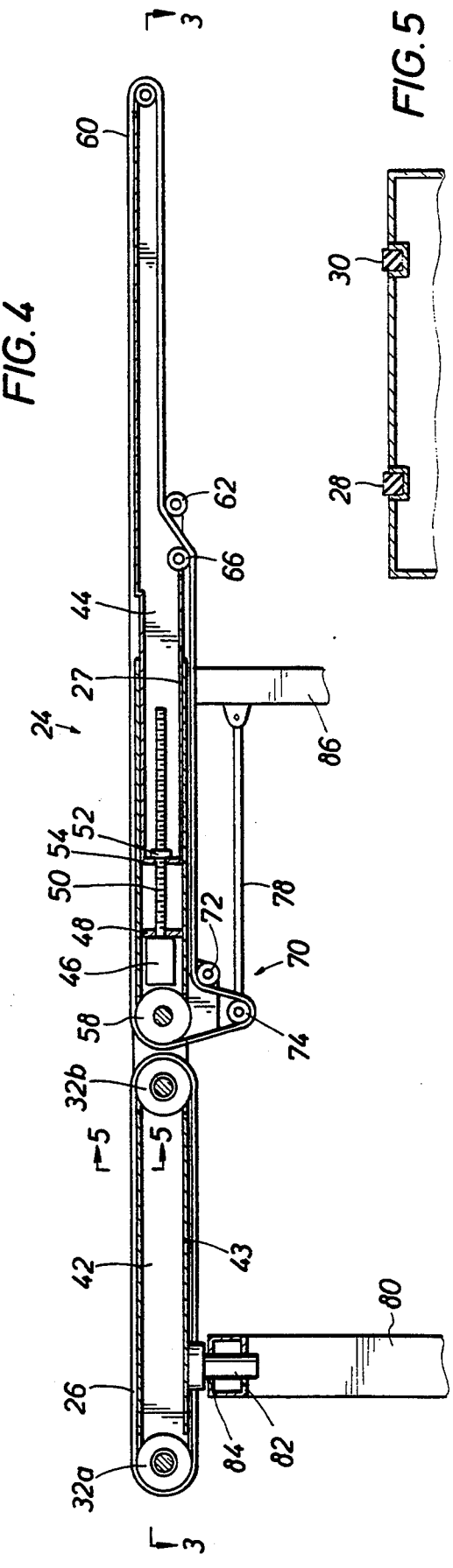
FIG. 4 is a section view taken along line 4—4 of FIG. 3.

Referring to FIGS. 3 and 4, a motor 46 is mounted to an outer frame plate 48. The motor 46 rotates a threaded shaft 50 which engages a threaded nut 52 mounted to an inner frame plate 54. Rotation of the threaded shaft 50 by the motor 46 causes longitudinal movement of the inner frame 44 relative to the outer frame 42.

The inner frame 44 includes a rotatably-mounted end delivery conveyor pulley or roller 56 at a discharge end 60 of the orienting unit 24. A second roller 62 is rotatably-mounted to the lower portion of the inner frame 44. A third roller 66 is rotatably-mounted to the lower portion of the inner frame 44.

Referring to FIGS. 2 and 4, the delivery belt conveyors 29 and 31 of the orienting unit 24 have a tensioner assembly, designated generally as numeral 70. The tensioner assembly 70 includes a pair of pulleys 72 and 74. The pair of pulleys 72 and 74 are rotatably-mounted to the lower portion of the outer frame 42. The pulley 74 is rotatably-mounted to a pivot arm 78. The pivot arm 78 is pivotally connected to a vertical support 86 which supports the discharge end 60 of the orienting unit 24. A tensioning means, as for example a spring (not shown), is provided to maintain the pair of endless belt delivery conveyors 29 and 31 in generally constant tension as the inner frame 44 is moved longitudinally relative to the outer frame 42. The generally constant tension can be provided by applying a constant clockwise force to the pivot arm 78 such that as the inner frame 44 moves towards the outer frame 42, the pivot arm 78 rotates counter-clockwise to take up the slack in the delivery belt conveyors 29 and 31.

As shown in FIG. 4, the orienting unit 24 is pivotally connected to a stanchion 80 at the receiving end 26 of the orienting unit 24. A vertical pivot pin 82 is attached to the bottom 43 of the outer frame 42. The pivot pin 82 is received in a pin opening 84 in the upper end of the stanchion 80. The orienting unit 24 is further supported near the distal end 27 of the outer frame 42 to maintain the orienting unit 24 in a generally horizontal position. The distal support 86 is secured to the bottom 43 of the outer frame 42. The lower end 88 of the distal support 86 is adapted to roll or slide across a floor surface as shown in FIG. 2.

Referring to FIG. 3, a motor 90 is mounted to a stationary member (not shown). The motor 90 rotates a threaded shaft 92 which engages a threaded nut 94 mounted to the outer box frame 42. Rotation of the threaded shaft 92 by the motor 90 causes rotational movement of the orienting unit 24 about the pivot pin 82.

Referring to FIGS. 1 and 2, the discharge end 60 of the orienting unit 24 is located over a smooth forming table 96 of a pattern forming assembly 98. The pattern forming assembly 98 includes a pair of opposing side walls 100 and 102 and a retractable back wall 104 adjacent the rear 106 of the forming table 96. The retractable back wall 104 can be lowered below the forming table 96.

Referring to FIGS. 2 and 8, the retractable back wall 104 is mounted to a pair of cylindrical rods 108 which slide in vertical sleeves 110 mounted to a pattern forming assembly frame 112. The cylindrical rods 108 have a lower end 114 which are pin connected to lift rods 116. The opposite ends 122 of the lift rods 116 are connected to one another with a shaft 118 for synchronization. The shaft 118 is rotatably mounted to the pattern forming assembly frame 112. A cylinder 120 is pin connected to the pattern forming assembly frame 112 at one end and pin connected to a lift rod 116 at its other end.

Referring to FIGS. 1, 2 and 9, a stacking assembly 124 is positioned adjacent the pattern forming assembly 98. The stacking assembly 124 includes an adjacent surface 126 slidably mounted in a pair of horizontal slides 128. The adjacent surface 126 is in the same horizontal plane as the upper surface of the forming table 96 and is positioned adjacent to the retractable back wall 104 with the forming table 96 on the opposite side of the retractable back wall 104. A vertical wall 130 spans between the pair of horizontal slides 128 at a forward end 132 of the slides 128. A cylinder 134 is attached to the rear portion 136 of the adjacent surface 126 to provide horizontal sliding movement of the adjacent surface 126.

Referring to FIG. 2, the adjacent surface 126 is mounted directly over a vertical lift device 138, such as a scissor lift table, for vertically positioning a pallet P. Vertical lift devices are common in the industry and are commercially available from Autoquip Corporation of Guthrie, Okla.

Referring to FIGS. 2, 6 and 7, a pusher bar assembly 140 is mounted to the pattern forming assembly 98. The pusher bar assembly 140 comprises a pusher bar assembly frame 142 having upright members 144 mounted near the corners of the forming table 96. A pair of horizontal members 146 connect the upright members 144 generally along and above the two side walls 100 and 102. As shown in FIGS. 6 and 7, a pair of drive spockets 148 are rotatably mounted to the pusher bar assembly frame 142 near a forward end 150 of the frame 142. A pair of return sprockets 152 are rotatably mounted to a rear end 154 of the pusher bar assembly frame. A pair of endless chains 156 connect the drive sprockets 148 to the return sprockets 152. A pusher bar 158 is connected to the pair of endless chains 156. The pusher bar 158 spans across the width of the forming table 96 and is parallel to the retractable back wall 104.

Preferably, the pair of drive sprockets 148 are belt driven by a drive motor 160 mounted beneath the forming table 96 to the pattern forming assembly frame 112. A first pulley 162 is mounted to a motor shaft 164. An endless belt 166 connects the first pulley 162 to a double pulley assembly 168 rotatably mounted beneath the forming table 96. Preferably, the double pulley assembly 168 is mounted on a synchronizing shaft 170 having a single pulley 172 at its opposite end. A pair of endless belts 174 connect the pulleys 168 and 172 on the synchronizing shaft 170 to pulleys 176 in fixed attachment to the drive sprockets 148.

Referring to FIGS. 1 and 2, the programmable control computer 180 controls the functions of the pattern-forming apparatus for container palletizing A. The control computer 180 can be programmed to control the individual speeds of the orienting conveyor belts 28 and 30, the speed of the delivery conveyor belts 29 and 31, the length and horizontal positioning of the orienting unit 24, the retractable back wall 104, and the pusher bar 158. Preferably, the same control computer 180 that controls the servo motors will also build the patterns. A suitable operator interface permits the operator to select from a set of previously defined patterns, or generate a new pattern. The computer 180 takes the selected pattern and controls the conveyors, etc. to produce desired pattern on the pallet.

It is to be understood that the orienting unit 24 could also be comprised of a jointed arm (not shown) rather than the telescoping design as described above. As in the telescoping design described above, the jointed arm would also have the ability to receive a container at a pin-connected receiving end and move its discharge end anywhere within a predetermined horizontal plane over the pattern forming table 96. The jointed arm would also have a pair of endless orienting belts for rotating the containers.

OPERATION OF THE PRESENT INVENTION

The containers C are delivered in a predetermined starting orientation on the infeed conveyor 20 to the receiving end 26 of the orienting unit 24. The infeed conveyor 20 delivers a succession of containers C in single file to the orienting unit 24.

The orienting unit 24 receives the containers C and transports the containers C on the pair of endless orienting conveyor belts 28 and 30 to the pair of endless delivery conveyor belts 29 and 31 which discharge the containers C at the discharge end 60 of the orienting unit 24. The angular orientation of the container C is programmably controlled by the control computer 180 controlling the speeds of the two parallel orienting conveyor belts 28 and 30. The container C is rotated while it is being transported by the pair of endless orienting belt conveyors 28 and 30 by driving the orienting belt conveyors 28 and 30 at different speeds.

The position of the discharge end 60 of the orienting unit 24 and the speed of the delivery belt conveyors 29 and 31 are also programmably controlled by the control computer 180 to deliver the container C to the desired location on the forming table 96.

The first container C is normally placed into a corner formed by the retractable back wall 104 and a side wall 100. The container C is discharged with enough velocity to carry it clear of the discharge end 60 of the orienting unit 24. Subsequently, the container C position is determined by the desired pattern programmed into the control computer 180. The discharge end 60 of the orienting unit 24 moves in the horizontal plane from one placement point to another. The length of the orienting unit 24 also varies depending on the desired placement of the container C on the forming table 96. The containers C are placed very fast with the orienting belt conveyors 28 and 30 angularly orienting each container C and then the delivery belt conveyors 29 and 31 quickly discharging the container C to its desired location on the forming table 96. Since all functions are servo-driven and computer controlled, patterns of almost infinite variety can be produced instantly.

When a layer or tier of containers C has been completed, the retractable back wall 104 drops below the upper surface of the pattern forming table 96 and the pusher bar 158 pushes the tier onto the adjacent surface 126, after which the retractable back wall 104 comes back up and the apparatus A begins forming the next tier on the pattern forming table 96. The adjacent surface 126 moves horizontally, allowing the containers C on it to drop a short distance onto the pallet P supported by the vertical lift device 138. The vertical lift device 138 then lowers until the containers C are just below the adjacent surface 126. The adjacent surface 126 returns to its original position.

The process continues until the desired number of tiers are stacked on the pallet P. The loaded pallet P is removed from the vertical lift device 138 and a new pallet P is placed on the lift device 138. The lift device 138 raises the empty pallet P to an elevation just below the adjacent surface 126 ready for another cycle.

The foregoing disclosure and description of the invention is illustrative and explanatory thereof, and various changes in the size, shape, and materials, as well as in the details of illustrative construction and assembly, may be made without departing from the spirit of the invention.

We claim:

1. An apparatus for pattern-forming and palletizing containers on a pallet, the apparatus comprising:
    an infeed conveyor adapted to receive and transport a container to a fixed location;
    a generally horizontal orienting unit having a receiving end and a discharge end, said receiving end adapted to horizontally rotate about a vertical axis, said orienting unit comprising:
        a pair of substantially parallel belt conveyors in side-by-side array,
        means for driving each said belt conveyor independently of each other, and
        means for adjusting the relative distance between said receiving and discharge ends of said orienting unit; and
    means for rotating said orienting unit about said vertical axis,
    wherein said receiving end of said orienting unit is proximate to said fixed location of said infeed conveyor.

2. The apparatus according to claim 1, further comprising:
    means for controlling the direction and speed of each said belt conveyor for delivery and orientation of the container to the discharge end of said orienting unit.

3. The apparatus according to claim 1, wherein said means for rotating said orienting unit comprises:
    a threaded shaft;
    an orienting motor connected to said shaft and capable of rotating said shaft; and
    a threaded nut fixedly attached to said orienting unit and threadably engaging said shaft,
    wherein the rotation of said shaft results in the rotation of said orienting unit.

4. The apparatus according to claim 1, wherein said orienting unit comprises a first section and a second section telescopically connected to said first section.

5. The apparatus according to claim 4, wherein said means for adjusting the relative distance between said receiving and discharge ends comprises:
    a second threaded nut fixedly attached to one of said first and second sections; and
    an adjusting motor mounted to the other of said first and second sections;
    a second threaded shaft connected to said adjusting motor and in threaded engagement with said second threaded nut,
    wherein the rotation of said second threaded shaft by said adjusting motor adjusts the relative distance between said receiving and discharge ends.

6. The apparatus according to claim 5, further comprising means for maintaining tension in said pair of belt conveyors as the relative distance between said receiving and discharge ends is adjusted.

7. The apparatus according to claim 1, further comprising a forming assembly proximal said discharge end of said orienting unit.

8. The apparatus according to claim 7, wherein said forming assembly comprises:
    a substantially horizontal forming table having a front, a rear and two sides; and
    a retractable back wall adjacent said rear of said forming table.

9. The apparatus according to claim 8, further comprising two side walls near said sides of said forming table, wherein said two side walls angle towards each other at said retractable back wall.

10. The apparatus according to claim 8, further comprising a pusher bar assembly to remove a tier of containers from said forming table.

11. The apparatus according to claim 10, wherein said pusher bar assembly comprises:
    a movable pusher bar capable of travelling above said forming table from a first point near said front to a second point near said rear of said forming table.

12. The apparatus according to claim 11 wherein said pusher bar assembly comprises:
    at least one pair of sprockets rotatably mounted above said forming table;
    an endless chain connected to said pair of sprockets; and
    means for rotating said pair of sprockets,
    wherein said pusher bar is connected to said endless chain.

13. The apparatus according to claim 8, further comprising a stacking assembly positioned adjacent said forming assembly.

14. The apparatus according to claim 13, wherein said stacking assembly comprises:
    an adjacent surface capable of sliding horizontally;
    means for sliding said adjacent surface; and an adjustable lift device for vertically positioning the pallet.

15. An apparatus for pattern-forming and palletizing containers on a pallet, the apparatus comprising:
a generally horizontal orienting unit having a receiving end and a discharge end, said discharge end capable of limited horizontal movement, said orienting unit comprising:
a pair of substantially parallel belt conveyors in side-by-side array,
means for driving each said belt conveyor independently of each other, and
means for adjusting the relative distance between said receiving and discharge ends of said orienting unit;
means for controlling the direction and speed of each said belt conveyor for delivery and orientation of the container to the discharge end of said orienting unit; and
means for substantially horizontally moving said discharge end of said orienting unit.

16. The apparatus according to claim 15, wherein said orienting unit comprises a first section and a second section telescopically connected to said first section.

17. The apparatus according to claim 15, further comprising a forming assembly proximal said discharge end of said orienting unit.

18. The apparatus according to claim 17, wherein said forming assembly comprises:
a substantially horizontal forming table having a front, a rear and two sides; and
a retractable back wall.

19. The apparatus according to claim 18, further comprising two side walls near said sides of said forming table, wherein said two side walls angle towards each other at said retractable back wall.

20. The apparatus according to claim 18, further comprising a pusher bar assembly to remove a tier of containers from said forming table.

21. The apparatus according to claim 20, wherein said pusher bar assembly comprises a movable pusher bar capable of travelling above said forming table from a first point near said front to a second point near said rear of said forming table.

22. The apparatus according to claim 21 wherein said pusher bar assembly comprises:
at least one pair of sprockets rotatably mounted above said forming table;
an endless chain connected to said pair of sprockets; and
means for rotating said pair of sprockets,
wherein said pusher bar is connected to said endless chain.

23. The apparatus according to claim 18, further comprising a stacking assembly positioned adjacent said forming assembly.

24. The apparatus according to claim 23, wherein said stacking assembly comprises:
an adjacent surface capable of sliding horizontally;
means for sliding said adjacent surface; and
an adjustable lift device for vertically positioning the pallet.

25. A method of arranging a plurality of containers into desired patterns in an apparatus having an infeed conveyor, an orienting unit having a receiving end and a moveable discharge end, a pair of side-by-side conveyor belts on the orienting unit, and a pattern forming table, the steps comprising:
delivering containers in the received orientation on the infeed conveyor to the orienting unit;
selectively changing the speed of one conveyor belt relative to the other conveyor belt to cause the container to rotate to a predetermined, second orientation relative to the orienting unit; and
selectively rotating the orienting unit to position the discharge end of the orienting unit to a predetermined location for discharging the container onto the pattern forming table.

26. The method according to claim 25, wherein the containers are oriented generally parallel to the orienting unit in the first orientation and the selective speed change is controlled so as to rotate the preselected container approximately ninety degrees.

27. The method according to claim 25, further comprising the step of selectively positioning the discharge end of the orienting unit whereby the container can be discharged to any location on the pattern forming table.

28. The method according to claim 27, wherein the step of selectively positioning the discharge end comprises adjusting the distance between the receiving end and the discharge end of the orienting unit.

* * * * *